US012594148B2

(12) United States Patent
Diamant

(10) Patent No.: US 12,594,148 B2
(45) Date of Patent: Apr. 7, 2026

(54) AID APPARATUS FOR POSITIONING AN ORTHODONTIC BRACKET IN A CENTER OF A TOOTH

(71) Applicant: Cerna Diamant, Rishon Lezion (IL)

(72) Inventor: Cerna Diamant, Rishon Lezion (IL)

( * ) Notice: Subject to any disclaimer, the term of this patent is extended or adjusted under 35 U.S.C. 154(b) by 45 days.

(21) Appl. No.: 18/809,372

(22) Filed: Aug. 20, 2024

(65) Prior Publication Data

US 2026/0053598 A1    Feb. 26, 2026

(51) Int. Cl.
*A61C 7/14*        (2006.01)
*A61C 9/00*        (2006.01)

(52) U.S. Cl.
CPC .............. *A61C 7/146* (2013.01); *A61C 9/006* (2013.01)

(58) Field of Classification Search
CPC .................................................... A61C 7/146
See application file for complete search history.

(56)             References Cited

U.S. PATENT DOCUMENTS

| | | | | | |
|---|---|---|---|---|---|
| 5,448,472 | A | * | 9/1995 | Mushabac | ............ A61C 9/0053 433/70 |
| 6,905,337 | B1 | * | 6/2005 | Sachdeva | ................. A61C 5/00 433/229 |
| 9,503,282 | B2 | * | 11/2016 | Kody | ................... H04N 1/0022 |
| 2001/0038705 | A1 | * | 11/2001 | Rubbert | ................. B33Y 50/00 382/128 |
| 2002/0006217 | A1 | * | 1/2002 | Rubbert | ................. A61C 7/146 382/154 |

| | | | | | |
|---|---|---|---|---|---|
| 2002/0015934 | A1 | * | 2/2002 | Rubbert | ................. A61C 7/146 433/29 |
| 2002/0168602 | A1 | * | 11/2002 | Taub | ...................... A61C 7/146 433/29 |
| 2005/0043837 | A1 | * | 2/2005 | Rubbert | ................... A61C 7/00 700/118 |
| 2005/0233276 | A1 | * | 10/2005 | Kopelman | ............. A61C 7/146 433/3 |
| 2005/0239013 | A1 | * | 10/2005 | Sachdeva | ............... A61C 7/146 433/24 |
| 2006/0212260 | A1 | * | 9/2006 | Kopelman | ............. G16H 50/50 702/152 |
| 2006/0263741 | A1 | * | 11/2006 | Imgrund | .................. A61C 7/00 433/213 |
| 2010/0239136 | A1 | * | 9/2010 | Gandyra | ................ G01B 11/03 382/128 |
| 2014/0329195 | A1 | * | 11/2014 | Huang | ................... A61C 7/002 433/24 |
| 2016/0206403 | A1 | * | 7/2016 | Ouellette | ............. A61C 8/0096 |
| 2016/0302888 | A1 | * | 10/2016 | García Acosta | ....... A61C 7/146 |

(Continued)

FOREIGN PATENT DOCUMENTS

| | | |
|---|---|---|
| BR | PI0904716 A2 | 7/2011 |
| KR | 20100052077 A | 5/2010 |

*Primary Examiner* — Nicholas D Lucchesi
(74) *Attorney, Agent, or Firm* — AlphaPatent Associates Ltd.; Daniel J. Swirsky

(57)             ABSTRACT

The invention is directed to and apparatus and method for positioning an orthodontic bracket in a center of a tooth, the method comprising the steps of: photographing a tooth for producing an image thereof; detecting in the image crossed axes of the tooth; projecting on the tooth crossed lines that correspond with the determined crossed axes of the image; shifting an orthodontic bracket placed on the tooth so that its crossed axes coincide with the projected crossed lines on the tooth; and fixing the bracket to the tooth.

15 Claims, 10 Drawing Sheets

(56) References Cited

U.S. PATENT DOCUMENTS

| | | | |
|---|---|---|---|
| 2018/0104022 A1* | 4/2018 | Cheang | G06T 17/20 |
| 2018/0140381 A1* | 5/2018 | Gravenstein | A61C 7/146 |
| 2018/0367786 A1* | 12/2018 | Furst | G01J 3/2823 |
| 2021/0295545 A1* | 9/2021 | Ma | A61C 9/0046 |
| 2024/0285379 A1* | 8/2024 | Saphier | A61C 9/006 |

* cited by examiner

AID APPARATUS FOR POSITIONING AN ORTHODONTIC BRACKET IN A CENTER OF A TOOTH

FIELD

The invention relates to the field of aid facilities for orthodontic care.

BACKGROUND

Orthodontics is a dentistry specialty that addresses the diagnosis, prevention, management, and correction of mal-positioned teeth and jaws, and misaligned bite patterns. It may also address the modification of facial growth, known as dentofacial orthopedics.

Abnormal alignment of the teeth and jaws is very common. Nearly 50% of the developed world's population, according to the American Association of Orthodontics, has malocclusions severe enough to benefit from orthodontic treatment. Treatment may require several months to a few years, and entails using dental braces and other appliances to gradually adjust tooth position and jaw alignment.

Braces are usually placed on the front side of the teeth, but they may also be placed on the side facing the tongue (called lingual braces). Brackets made out of stainless steel or porcelain are bonded to the center of the teeth using an adhesive. Wires are placed in a slot in the brackets which allows for controlled movement in all three dimensions. (From Wikipedia, Orthodontics) A common way of gluing a bracket to a tooth is using a UV adhesive, i.e., an adhesive that hardens when being irradiated by ultraviolet light.

It is advisable to place a bracket in the center of a tooth, in order to prevent application of force on the sides of the tooth, as a result of which the alignment of the tooth will be compromised. As a result, a physician has to find the center of the tooth.

One technique of detecting a center of a tooth is by a ruler and/or gauge. Of course, this is a very cumbersome way.

SUMMARY

In one aspect, the invention is directed to a handheld aid apparatus for positioning an orthodontic bracket in a center of a tooth, the apparatus comprising a radially moveable fixture (10), a camera (31) fixedly connected to the radially moveable fixture, for photographing a tooth (17), and producing an image thereof, a crossed lines projector (28), fixedly connected to the radially moveable fixture (10) and thereby movable along with the radially moveable fixture (10), a processing unit (30), for calculating in the image crossed axes of the photographed tooth (17), and directing the radially moveable fixture (10) so that the crossed lines projected by the projector (28) on the tooth correspond with the calculated crossed lines.

The apparatus may further comprise an ultraviolet projector (13), fixedly connected to the radially moveable fixture and moves along with the fixture (10), for projecting ultraviolet light on the tooth, for hardening an adhesive smeared on the tooth under an orthodontic bracket, thereby fixing the orthodontic bracket to the tooth.

The "center of the tooth" can be the center of gravity of a contour of the tooth, the center of gravity of an area confined inside a contour of the tooth, and actually the system designer can determine the center according to his insights.

The tilt of the crossed axes of the tooth can be defined as a tilt of the tooth with reference to its jaw.

According to embodiments of the invention, the vertical axis of the crossed axes is calculated by a line of best fit of a middle of horizontal lines between edges of a contour of said tooth, wherein said lines being distant from each other.

According to embodiments of the invention, the processing unit (30) is further adapted to detect whether crossed axes of an orthodontic bracket (14) coincide with the crossed axes of the tooth, and if so, to activate the ultraviolet projector (13) to light.

The apparatus may further comprise a button (18), for manually activating the ultraviolet projector (13).

According to embodiments of the invention, the crossed lines projector (28) projects a laser beam.

According to embodiments of the invention, the crossed lines projector (28) projects light through a septum having a slot (32) in a form of a cross.

The apparatus may further comprise a separate stick (16) having a magnetic tip (33), for attaching thereto the orthodontic bracket (14).

The apparatus may further comprise an ultraviolet projector attached to the stick (16).

Preferably, the magnetic tip (33) is spherical.

In another aspect, the invention is directed to a method for positioning an orthodontic bracket in a center of a tooth, the method comprising the steps of photographing a tooth for producing an image thereof, detecting in the image crossed axes of the tooth, projecting on the tooth crossed lines that correspond with the determined crossed axes of the image, shifting an orthodontic bracket placed on the tooth so that its crossed axes coincide with the projected crossed lines on the tooth, and fixing the bracket to the tooth.

According to one embodiment of the invention, the fixation is carried out by smearing adhesive on the tooth before placing the orthodontic bracket on the tooth, and projecting ultraviolet light on the tooth after placing the orthodontic bracket on the tooth so that its crossed axes coincide with the crossed axes of the tooth.

The reference numbers have been used to point out elements in the embodiments described and illustrated herein, in order to facilitate the understanding of the invention. They are meant to be merely illustrative, and not limiting. Also, the foregoing embodiments of the invention have been described and illustrated in conjunction with systems and methods thereof, which are meant to be merely illustrative, and not limiting.

BRIEF DESCRIPTION OF THE DRAWINGS

Embodiments, features, and aspects of the invention are described herein in conjunction with the following drawings, in which.

Each of FIGS. 1a and 1b pictorially illustrates a BPA, according to embodiments of the invention.

Figure 3:
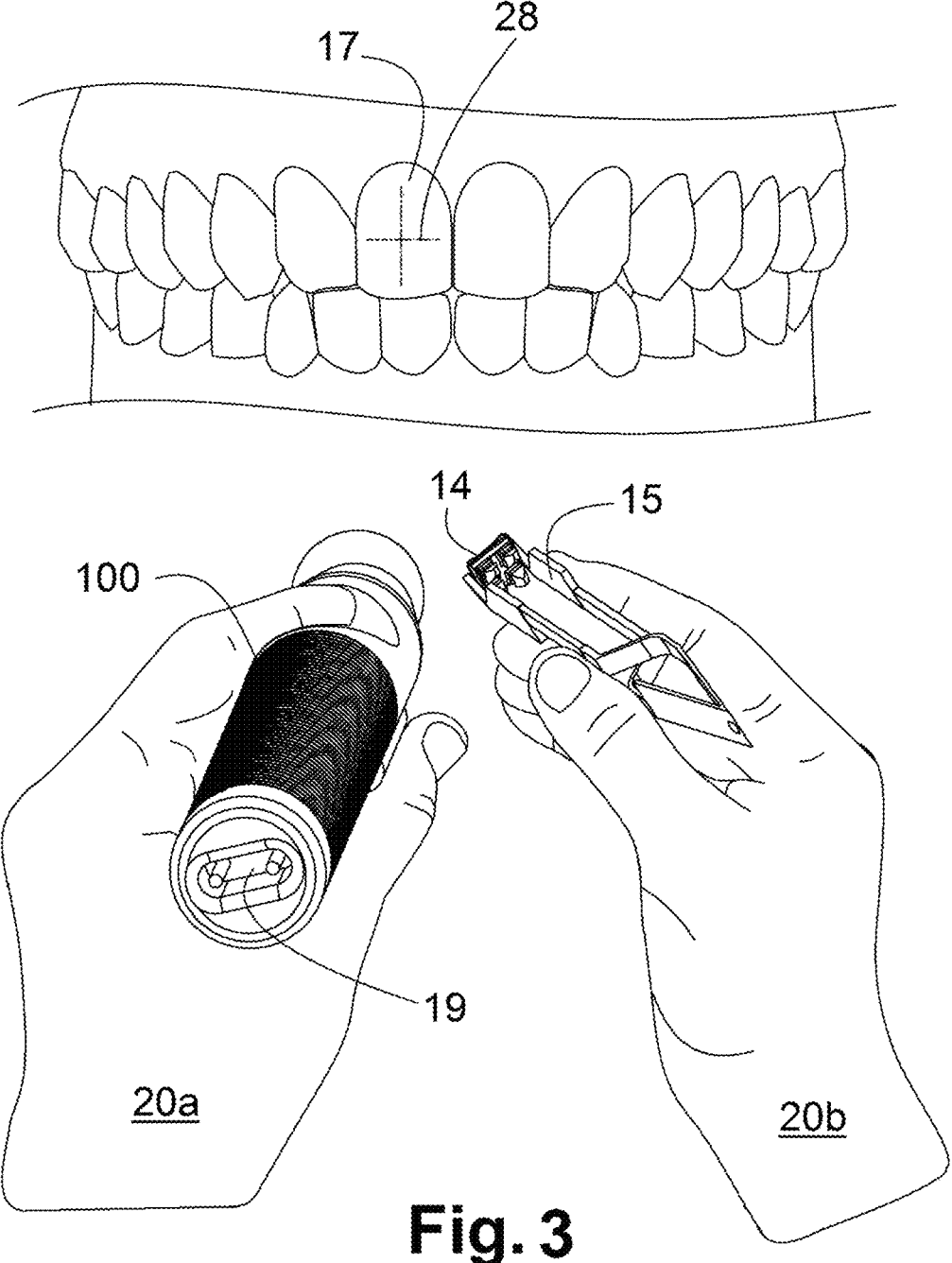
Figure 4:
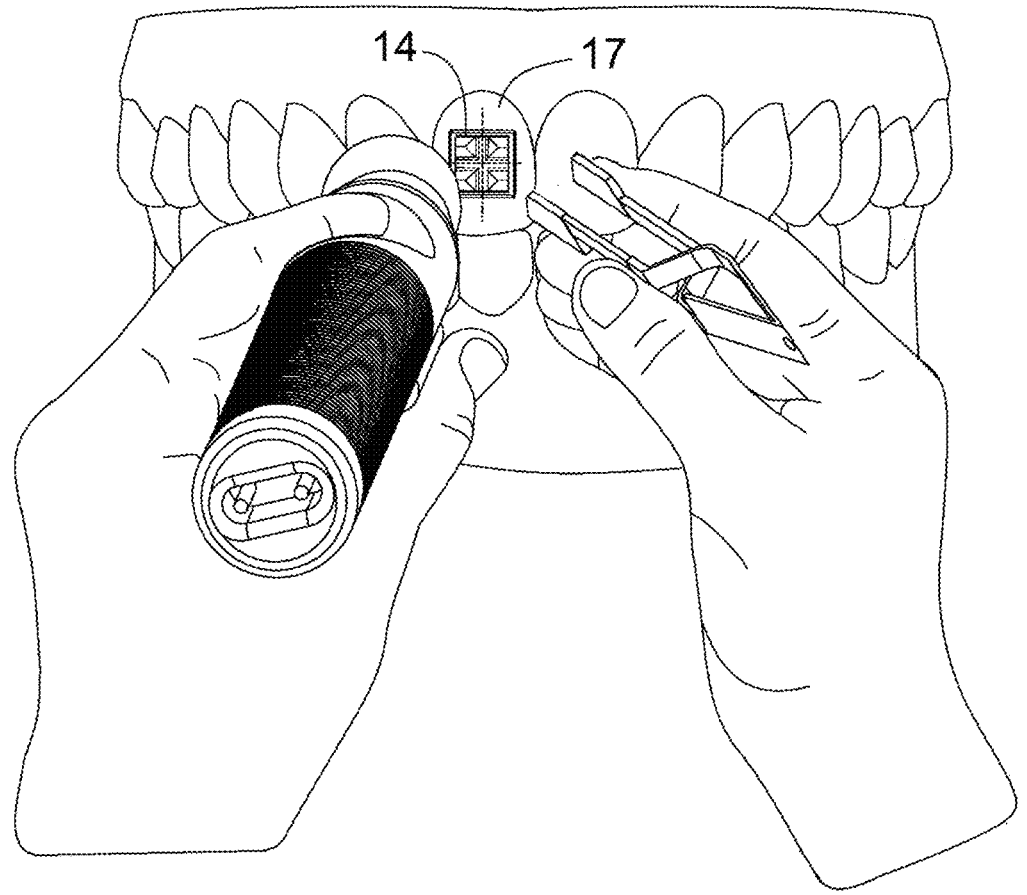
Figure 5:
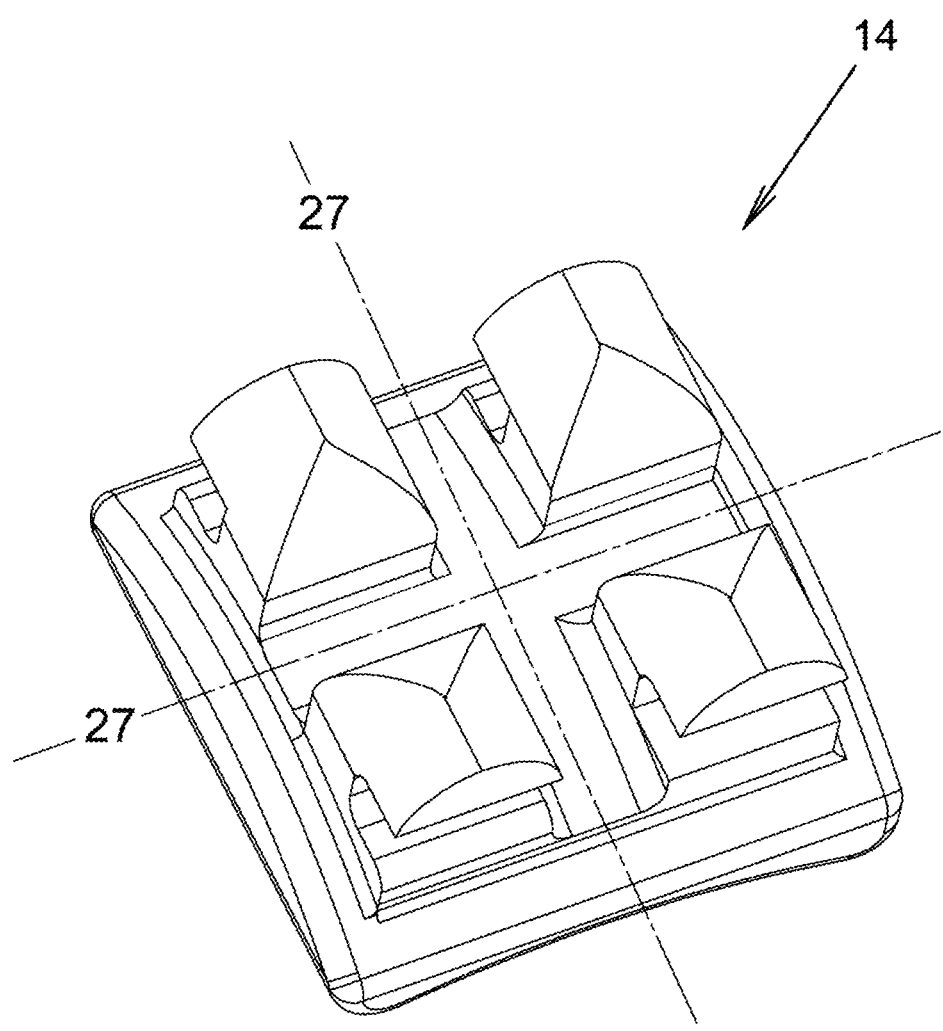
Figure 6:
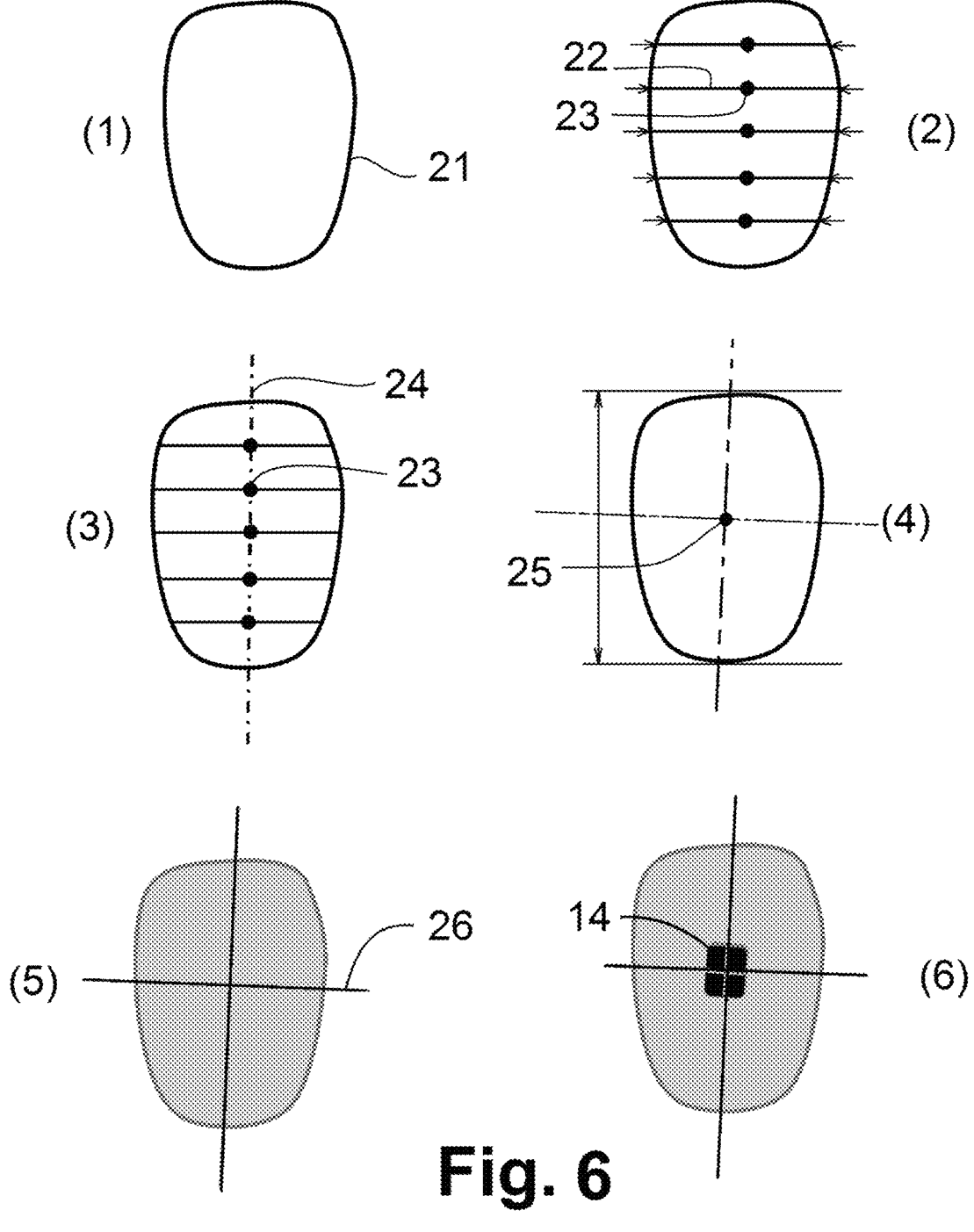
Figure 7:
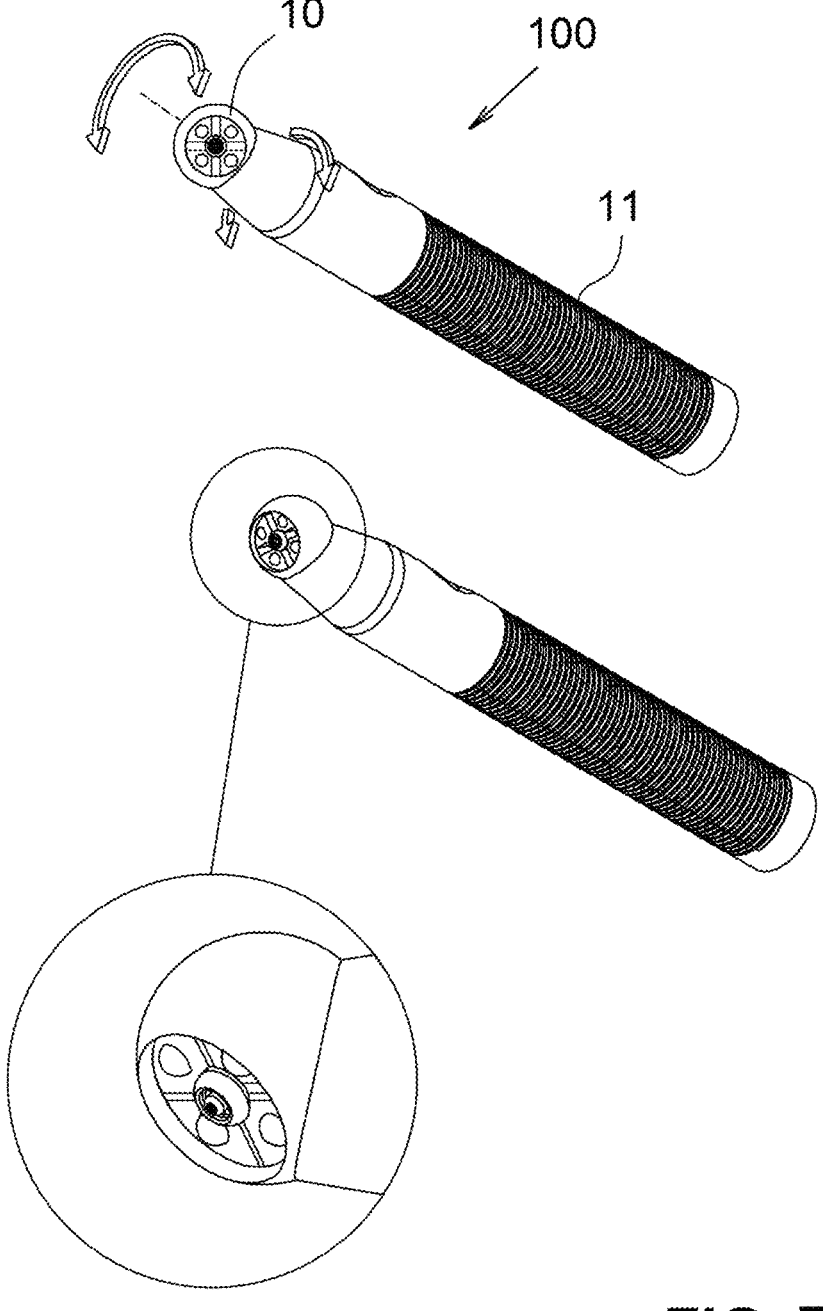
Figure 8:
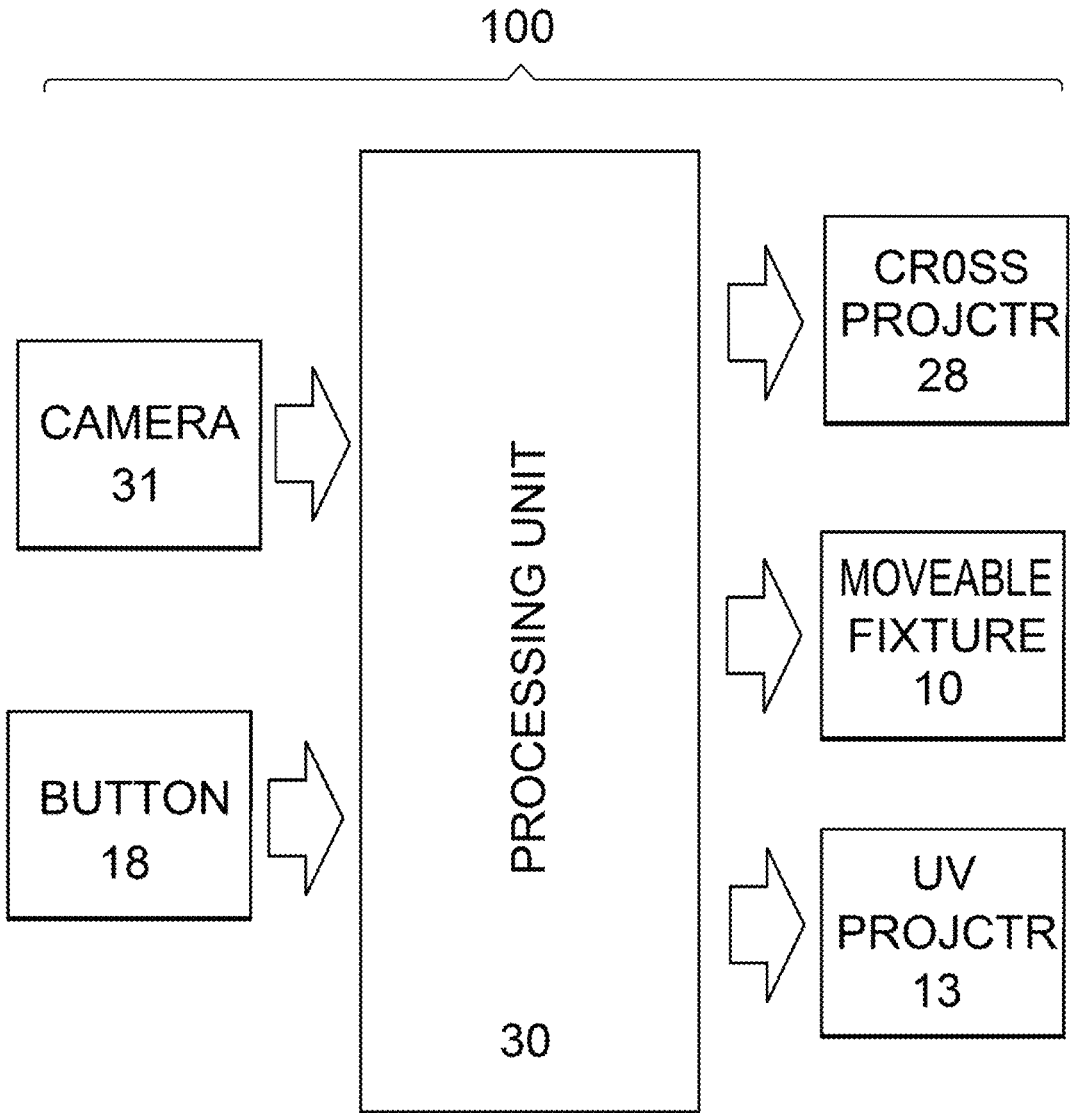
Figure 9:
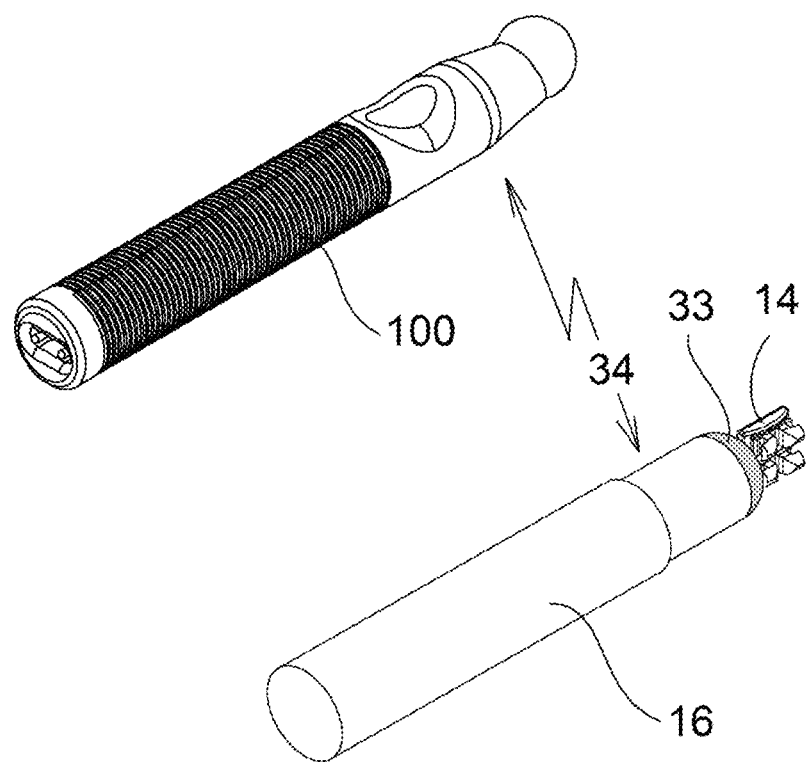
Figure 10:
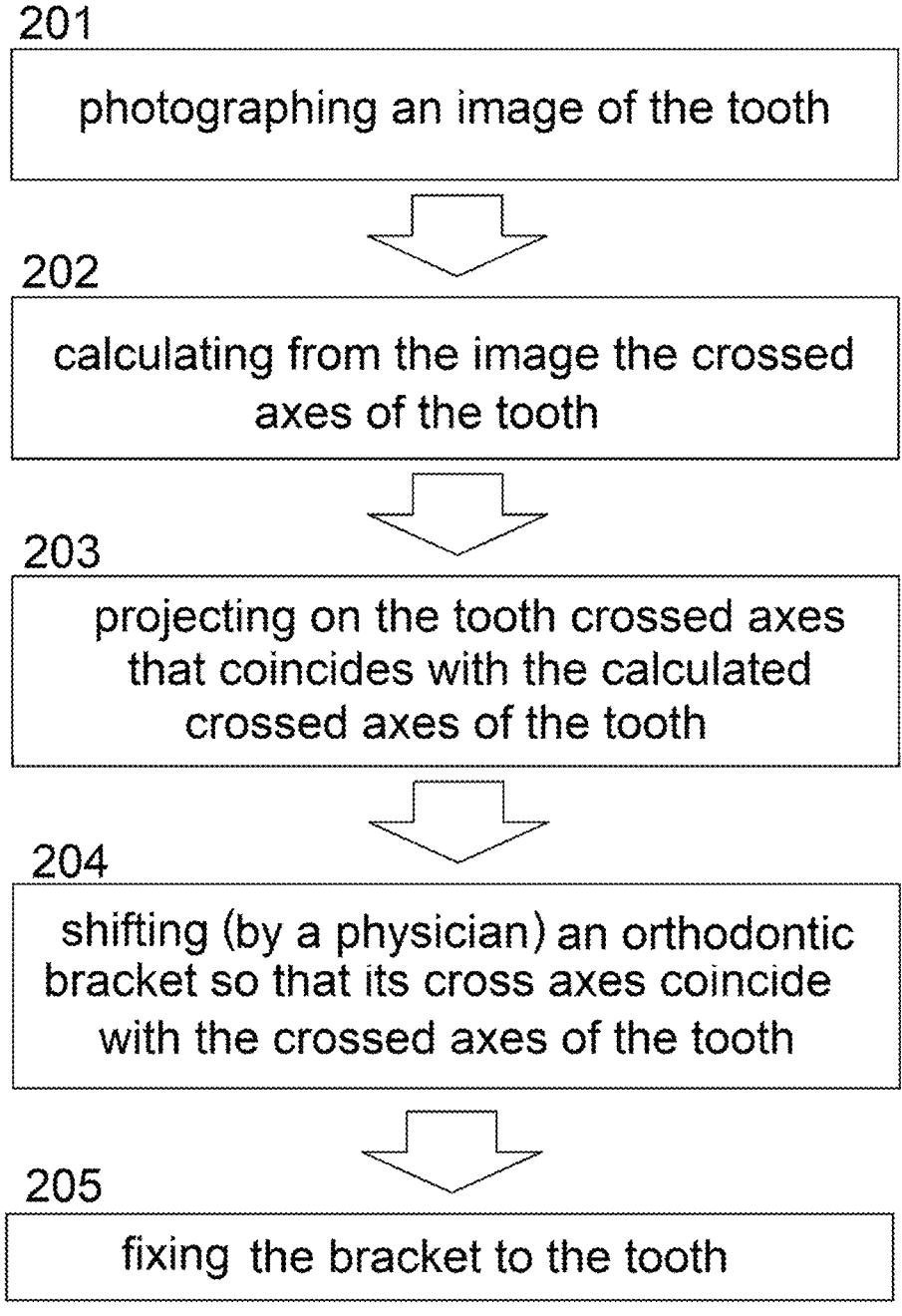

Each of FIGS. 3 and 4 pictorially illustrates a physician left hand 20a holding an BPA 100, and a physician right hand 20b holding a tweezers 15 which grabs an orthodontic bracket 14, according to one embodiment of the invention;

FIG. 5 pictorially illustrates an orthodontic bracket 14, according to the prior art;

FIG. 6 schematically illustrates steps in detecting a center of a photographed tooth and its vertical axis, according to embodiments of the invention;

FIG. 7 schematically demonstrates radial rotation ability of the radially moveable fixture 10 with regard to the handle 11 of the BPA 100, according to embodiments of the invention;

FIG. 8 is a block diagram of the components of a BPA 100, according to embodiments of the invention;

FIG. 9 schematically illustrates a BPA 100, according to embodiments of the invention; and FIG. 10 is a block diagram of a method for positioning an orthodontic bracket in a center of a tooth, according to embodiments of the invention.

It should be understood that the drawings are not necessarily drawn to scale.

DETAILED DESCRIPTION

The invention will be understood from the following detailed description of embodiments thereof, which are meant to be descriptive and not limiting. For the sake of brevity, some well-known features, methods, systems, procedures, components, circuits, and so on, are not described in detail.

The acronym BPA, "Bracket Positioning Apparatus", refers herein to an aid apparatus for placing an orthodontic bracket in the center of a tooth. For the sake of brevity, BPA is referred herein also as "apparatus".

The term "radially moveable body" refers herein as to a body rotatable around a center, and can be directed to any direction.

A center of a tooth may be defined in a variety of ways. Since in the invention a tooth is photographed from its front, the center of the tooth can be defined the center of gravity of the 2D photographed shape of the tooth. This is detailed hereinafter, a center of gravity of its contour, etc.

Figure 1A:
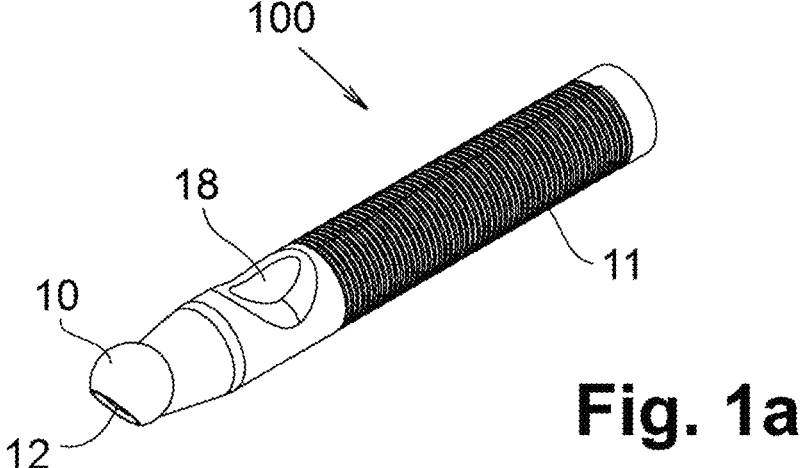
Figure 1B:
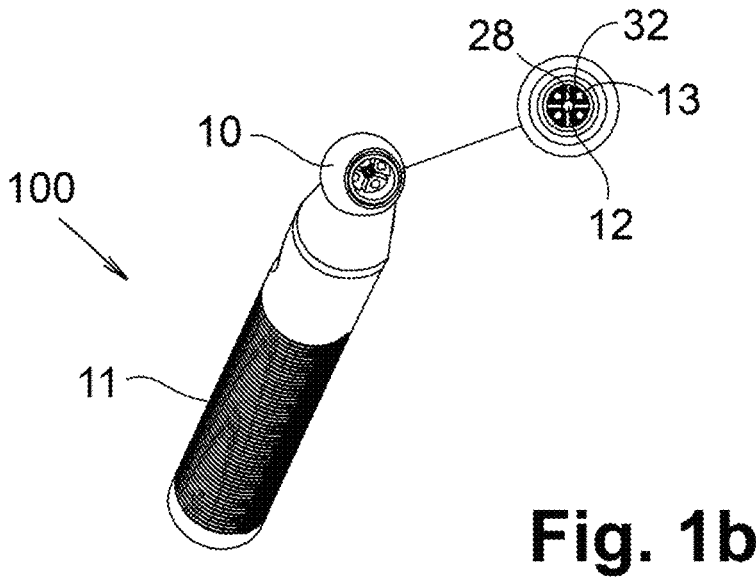

Each of FIGS. 1*a* and 1*b* pictorially illustrates a BPA, according to embodiments of the invention. FIG. 1*a* is a top perspective view thereof, and FIG. 1*b* is a bottom perspective view thereof.

The zoomed view shows the front of the radially moveable fixture 10 of the apparatus, which details its parts.

The apparatus, which is marked herein by reference numeral 100, is a handheld device which comprises:

(a) a radially moveable fixture 10;

(b) a camera lens 12;

(c) a slot 32 in a form of a cross in a septum 29;

(d) a processing unit (not shown in this figure);

(e) a handle 11; and optionally (f) an ultraviolet projector (also referred to as UV-projector) 13.

The radially moveable fixture 10 can be directed (by the processing unit) to any desired direction. The camera of the radially moveable fixture 10 may be a CCD (Charged-Couple Device), a CMOS (Metal Oxide Semiconductor+ active-pixel sensor), and the like, i.e., electronic camera.

The processing unit is a computerized entity which performs the image processing functions of the apparatus, changes the orientation the radially moveable fixture, and so on. It may be placed in the handheld device 100, or in an external device, such as a computer, which communicates with the handheld device via wired or wireless communication.

As known, a computer program can be replaced by a circuitry that performs the same functionality.

The projector (not shown) may project a light beam, such as a laser beam, through a slot 32 in a form of a cross on a septum 29. Of course, it is merely an example and the projected cross can be carried out in other ways.

The orientation of the radially moveable fixture 10 with regard to the handle 11 is controlled by the processing unit.

Figure 2:
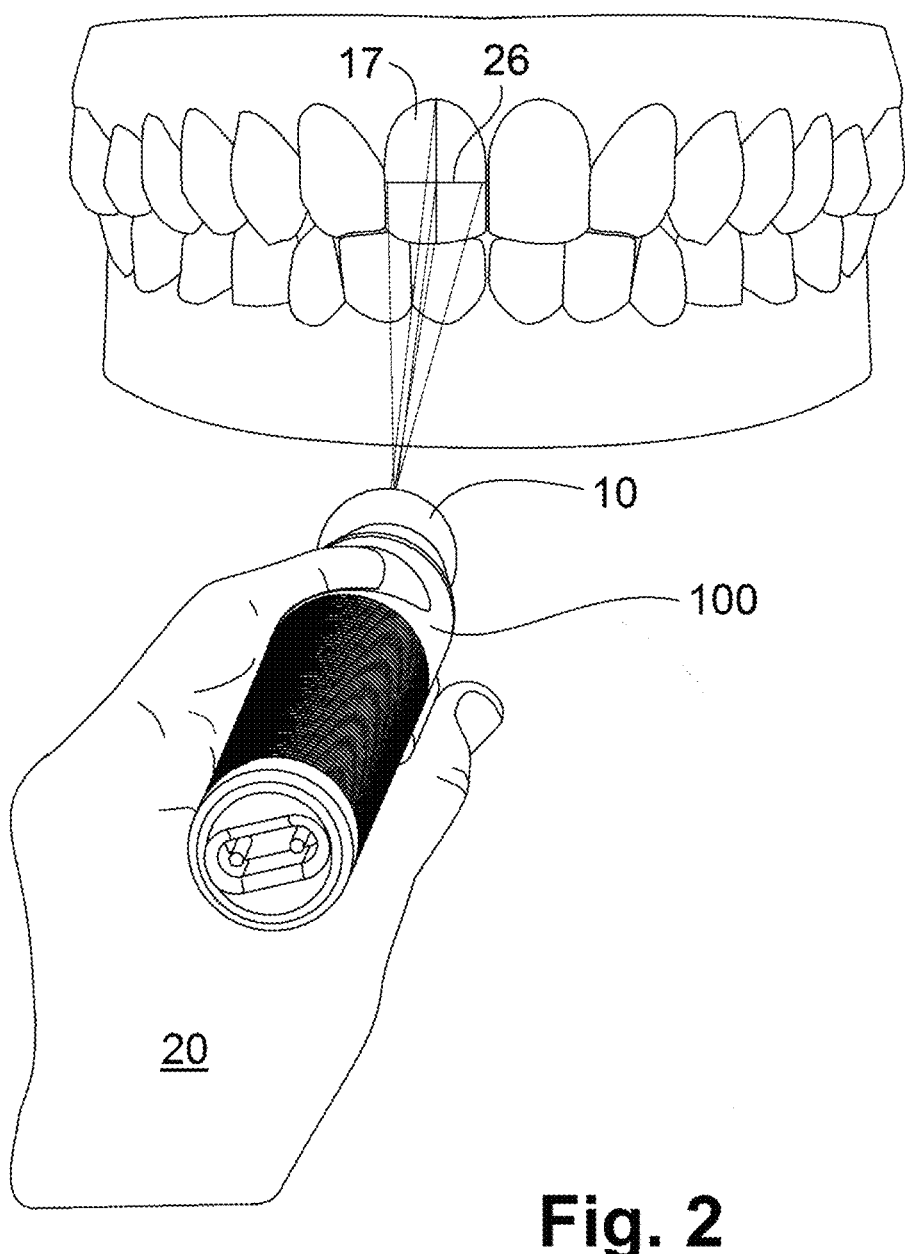
FIG. 2 pictorially illustrates a physician hand 20 holding a BPA 100, which projects a light beam 26 in a form of a cross on a tooth 17 of a patient, according to embodiments of the invention.

FIG. 2 pictorially illustrates a physician hand 20 holding a BPA 100, which projects a light beam 26 in a form of a cross on a tooth 17 of a patient, according to embodiments of the invention.

The object of the apparatus 100 is to assist a physician to place an orthodontic bracket in the "center" of the tooth 17, in such an orientation that the crossed axes of the bracket coincide with the crossed axes of the tooth.

The decision of how to define crossed axes of a tooth and of a bracket is up to the decision of the system (i.e., the BPA) designer. Generally speaking, the cross point of the crossed axes of a tooth is at the center of a tooth and the vertical axis of the crossed axes of the tooth is oriented as the tooth tilt. The definition of a center of a tooth is also up to the decision of the system designer.

Explanation about the axes of a tooth is provided in FIG. 6 and the description thereof.

While the BPA apparatus 100 continuously (intermittently or singularly) takes images of the tooth, its processing unit determines the crossed axes of the photographed tooth on every taken image, and projects the cross on the patient's tooth such that the projected cross is located on the center of the patient's tooth, and the tilt of the cross is as the tilt of the patient's tooth.

In order to perform this operation, the orientation of the camera with regard to the handle 11 of the apparatus is adjustable by the processing unit.

FIG. 3 pictorially illustrates a physician left hand 20*a* holding an BPA 100, and a physician right hand 20*b* holding a tweezers 15 which grabs an orthodontic bracket 14, according to one embodiment of the invention.

The physician may hold the BPA such that a distance of a several centimeters separate between the camera and the tooth. Furthermore, the camera may not be orthogonal to the tooth, but may be tilted so that the physician sees the tooth.

In FIG. 4, the physician places the orthodontic bracket 14 on the patient's tooth 17 such that the bracket's axes coincide of with the projected cross; i.e., the physician places the bracket in the center of the patient's tooth 17, in the orientation (tilt) of the patient's tooth 17.

For the sake of clarity, the drawings are not drawn to scale.

It should be noted that before placing the bracket on the patient's tooth, the physician smears, on the tooth, adhesive that hardens upon being projected by ultraviolet light. This is a common technology, but other technologies may also be applicable.

Once the bracket is placed on the center of the tooth in the tooth tilt, the apparatus signals to the physician thereabout and the physician projects ultraviolet light on the tooth, which hardens the adhesive, and thereby fixes the bracket to its location. The signaling may be by a sound, a light blink, etc.

According to another embodiment of the invention, once the processing unit has detected that the above-mentioned axes coincide, it automatically activates ultraviolet light projection on the tooth, which hardened the adhesive. Thus, the bracket has been attached to the center of the tooth, and its axes coincide with the projected axes.

The physician may release the bracket before, during or after the ultraviolet light is projected on the tooth.

As mentioned, the processing unit directs the radially moveable fixture 10 along with the camera towards the photographed tooth 17 such that the center of the projected cross is on the center of the photographed tooth, and the cross tilt corresponds to the photographed tooth.

FIG. 5 pictorially illustrates an orthodontic bracket 14, according to the prior art.

For the sake of simplicity, a bracket described hereon has rectangular/square form, and comprises two crossed ditches which determine its crossed axes 27. The ditches cross each other at the center of the bracket.

A Center of a Tooth

One way to determine the center of a photographed tooth is by the center of gravity of its contour. Another way is by calculating the center of gravity of its interior part (i.e., inside its contour). However, these ways do not provide the vertical axis of the tooth.

FIG. 6 schematically illustrates steps in detecting a center of a photographed tooth and its vertical axis, according to embodiments of the invention.

In the illustration of step (1) is shown a contour 21 of an image of a tooth. The contour 21 can be detected according to known image processing techniques of the prior art.

In step (2), the center 23 of each of several horizontal lines 22 between the contour is calculated. The horizontal lines are dispersed longitudinally the tooth.

In step (3), a line of best fit 24 that passes through points 23 is calculated. It is the vertical axis of the tooth.

In the illustration of step (4), the center 25 of the tooth is the middle between the top and bottom margins of the tooth along the line of best fit 24. The horizontal axis of the tooth is a crossed line to the vertical axis that passes through the center 25 of the tooth.

The horizontal axis may be orthogonal with the vertical axis. It may also be a horizontal line that passes through the center of the tooth (or photographed tooth).

In step (5), cross 26 is projected on the patient's tooth such that the cross beams coincide with the detected axes of the patient's tooth.

In step (6), the physician aligns the orthodontic bracket 14 on the projected cross 26 such that the projected cross passes through the crossed ditches of the bracket. Then, the bracket is illuminated with ultraviolet light, which hardens the adhesive, i.e., fixes the bracket to the tooth.

FIG. 7 schematically demonstrates radial rotation ability of the moveable fixture 10 with regard to the handle 11 of the BPA 100, according to embodiments of the invention.

As illustrated, the position of the moveable fixture 10 can be rotated radially, i.e., the camera which is fixedly connected to the radially moveable fixture 10 can be directed towards any direction from the center of the fixture 10, except of course towards the handle 11.

Since the radially moveable fixture 10 comprises also a crossed lines projector and also an ultraviolet projector, as the radially moveable fixture 10 changes its position, the crossed lines projector and the ultraviolet projector change their position correspondingly.

The object of the radially movable fixture is to allow directing the projected cross to any direction, however it should be noted that this object can be achieved also by electronic means, without any movable parts.

FIG. 8 is a block diagram of the components of a BPA 100, according to embodiments of the invention.

A processing unit 30 receives the sensed signals from the stills and/or video camera 31 of the BPA 100, calculates (by image processing) the center of the photographed tooth (i.e., the real tooth) and its tilt (with reference to the handle 11), and directs the radially moveable fixture 10 so that the crossed lines projector 28 projects a cross (or an alternative shape) on the center of the photographed tooth, i.e., on the real tooth.

The physician places the bracket in the center of the photographed tooth (on the real tooth), and activates by button 18 (or other input means) the UV (i.e., ultraviolet) projector 13 ultraviolet light on the tooth.

Alternatively, the image processing analyzes whether the bracket is placed in the center of the tooth and in the tilt of the tooth, and if it is placed in this position, the processing unit activates the UV-projector 13 to radiate UV light on the tooth.

Preferably, the BPA gets power from a battery (not shown); however instead of a battery the power is provided via wires.

According to embodiments of the invention, the image processing is carried out by of an external computerized device (e.g., a laptop computer, desktop computer, tablet computer, and even a smartphone) to the handheld device, which communicates with the BPA via wired or wireless communication.

FIG. 9 schematically illustrates a BPA 100, according to embodiments of the invention.

The BPA 100 communicates with an external stick 16 via wireless communication. The stick 16 comprises a magnetic tip 33 for attaching thereto an orthodontic bracket 14. Thus, instead of using tweezers to hold the bracket as in the prior art, the magnetic tip 33 attracts thereto the bracket 14 (assuming the bracket is made of ferromagnetic material). Once the adhesive smeared on a tooth is hardened as a result of radiating by ultraviolet light, the physician takes the stick 16 away, the bracket remains fixed to the tooth (assuming its attraction force is greater than the attraction force of the magnetic tip 33).

The stick 16 comprises also an ultraviolet projector 13 (not seen from this point of view) which is activated by a command from the BPA 100 received via the wireless communication.

The magnetic stick saves the need to apply force on the tweezers by the physician hand. Since mounting brackets on a patient's teeth requires physical effort, the stick helps to diminish this effort.

The magnetic stick can be used also an independent device, i.e., without communication with the BPA, as a replacement to the tweezers. A button (not shown) can be used for manual activation of the ultraviolet projector.

The ultraviolet projector is not mandatory, however if it is fixedly connected to the stick 16, it can use the stick's power source rather than of the BPA device 100, which allows both devices, 100 and 16 to operate a longer time. Furthermore, if the UV projector is placed on the tip of the stick, when activated it is placed adjacently to the bracket, and therefore its radiation is more intensive. In other words, a lesser power can be used to operate the UV projector.

In the illustration of FIG. 9 the magnetic tip is spherical. This provides ability to hold said bracket comfortably, i.e., easy to be placed at the center of a tooth.

FIG. 10 is a block diagram of a method for positioning an orthodontic bracket in a center of a tooth, according to embodiments of the invention.

In block 201, photographing an image of the tooth;

In block 202, calculating from the image the crossed axes of the tooth;

In block 203, projecting on the tooth crossed axes that coincides with the calculated crossed axes of the tooth;

In block 204, shifting (by a physician or by a mechanism) an orthodontic bracket so that its crossed axes coincide with the crossed axes of the tooth; and In block 205, fixing the bracket to the tooth.

In the description and claims herein, the following terms have been used:

The term "a center of a tooth" can be defined by a system designer, and it can be, for example, a center of gravity of a contour of the tooth, a center of gravity of an area confined inside a contour of the tooth, and so on.

The term "crossed axes" refer herein as to crossed vertical and horizontal axes. The axes are not necessarily orthogonal. For example, the vertical axis may be tilted while the other may be horizontal.

The term "crossed axes of a tooth" refers herein as to crossed axes of an external surface of a tooth such that the crossing point of the axes is at the center of the tooth, and the tilt of the vertical axis is as the tilt of the tooth.

The term "crossed axes of an orthodontic bracket" refers herein as to crossed axes such that their crossing point pass through the crossing point of the crossing ditches of an orthodontic bracket, and the tilt of the vertical axis is as the tilt of the orthodontic bracket.

The term "radial movable body" here refers to a body in a 3D space that can be rotated around a point in space, and can be directed in any direction in the 3D space.

The term UV refers herein to ultraviolet.

The term UV adhesive refers herein to an adhesive that hardens when being irradiated by ultraviolet light.

In the figures and/or description herein, the following reference numerals (Reference Signs List) have been mentioned:

numeral 100 denotes a BPA, the acronym of Bracket Placing Apparatus;

numeral 10 denotes a "radially moveable" fixture;

numeral 11 denotes a handle;

numeral 12 denotes a camera lens;

numeral 13 denotes an ultraviolet projector;

numeral 14 denotes an orthodontic bracket;

numeral 15 denotes a tweezers;

numeral 16 denotes a magnetic stick;

numeral 17 denotes a "real" tooth;

numeral 18 denotes a button;

numeral 19 denotes a charge inlet;

each of numerals 20, 20*a* and 20*b* denotes a physician hand;

numeral 21 denotes a contour line of an image of a tooth;

numeral 22 denotes a horizontal line;

numeral 23 denotes a middle point of a horizontal line between the edges of an image of a tooth;

numeral 24 denotes a line of best fit (https://www.mathsisfun.com/definitions/line-of-best-fit.html);

numeral 25 denotes a center of a tooth;

numeral 26 denotes a cross projected on a tooth;

numeral 27 denotes crossed axes of a bracket;

numeral 28 denotes a crossed lines projector;

numeral 29 denotes a septum;

numeral 30 denotes a processing unit;

fit numeral 31 denotes a camera;

numeral 32 denotes a slot in a form of a cross or other shape;

numeral 33 denotes a magnet;

numeral 34 Denotes Wireless Communication.

The foregoing description and illustrations of the embodiments of the invention have been presented for the purposes of illustration. It is not intended to be exhaustive or to limit the invention to the above description in any form.

Any term that has been defined above and used in the claims, should to be interpreted according to this definition.

The reference numbers in the claims are not a part of the claims, but rather used for facilitating the reading thereof. These reference numbers should not be interpreted as limiting the claims in any form.

What is claimed is:

1. A handheld aid apparatus for positioning an orthodontic bracket in a center of a tooth, the apparatus comprising:
   a radially moveable fixture (10);
   a camera (31) fixedly connected to said radially moveable fixture, for photographing a tooth (17), and producing an image thereof;
   a crossed lines projector (28), fixedly connected to said radially moveable fixture (10) and thereby movable along with said radially moveable fixture (10);
   a processing unit (30), for calculating in said image crossed axes of the photographed tooth (17), and directing said radially moveable fixture (10) so that crossed lines projected by said projector (28) on said tooth correspond with calculated crossed axes by said processing unit.

2. The apparatus according to claim 1, further comprising an ultraviolet projector (13), fixedly connected to said radially moveable fixture and movable along with said radially movable fixture (10), for projecting ultraviolet light on said tooth (17), for hardening an adhesive smeared on said tooth under an orthodontic bracket, thereby fixing said orthodontic bracket (14) to said tooth.

3. The apparatus according to claim 2, wherein said processing unit (30) is further adapted to detect whether crossed axes of an orthodontic bracket (14) coincide with crossed axes of said tooth, and if so, activate said ultraviolet projector (13) to light.

4. The apparatus according to claim 2, further comprises a button (18), for manually activating said ultraviolet projector (13).

5. The apparatus according to claim 1, wherein said center of said tooth is a center of gravity of a contour of said tooth.

6. The apparatus according to claim 1, wherein said center of said tooth is a center of gravity of an area confined inside a contour of said tooth.

7. The apparatus according to claim 1, wherein crossed axes of said tooth are tilted as a tilt of said tooth with reference to a jaw thereof.

8. The apparatus according to claim 1, wherein a vertical axis of said crossed axes is calculated by a line of best fit of a middle of each horizontal line between edges of a contour of said tooth, wherein said horizontal lines are distant from adjacent lines thereof.

9. The apparatus according to claim 1, wherein said crossed lines projector (28) projects a laser beam.

10. The apparatus according to claim 1, wherein said crossed lines projector (28) projects light through a septum having a slot in a form of a cross.

11. The apparatus according to claim 1, further comprising a separate stick (16) having a magnetic tip (33), for attaching thereto said orthodontic bracket (14).

12. The apparatus according to claim 11, further comprising an ultraviolet projector attached to said stick (16).

13. The apparatus according to claim 11, wherein said magnetic tip (33) is spherical.

14. A method for positioning an orthodontic bracket in a center of a tooth, the method comprising the steps of:
   photographing an image of a tooth;

detecting in said image crossed axes of said tooth;

projecting on said tooth crossed lines that correspond with the determined crossed axes of said image;

shifting an orthodontic bracket placed on said tooth so that crossed axes of said tooth coincide with the projected crossed lines on said tooth; and fixing said bracket to said tooth.

15. A method according to claim 14, wherein said fixing is carried out by smearing adhesive on said tooth before placing said orthodontic bracket on said tooth, and projecting ultraviolet light on said tooth for fixing said orthodontic bracket to said tooth.

\* \* \* \* \*